3,442,433
FOOD CONTAINER
Crescenzo R. Lombardi, 2055 Leif St., and Fritz O. Lester,
2176 Reneer St., both of Muskegon, Mich. 49441
Filed Aug. 14, 1967, Ser. No. 660,358
Int. Cl. B65d 1/34, 5/64, 43/10
U.S. Cl. 229—2.5                                    5 Claims

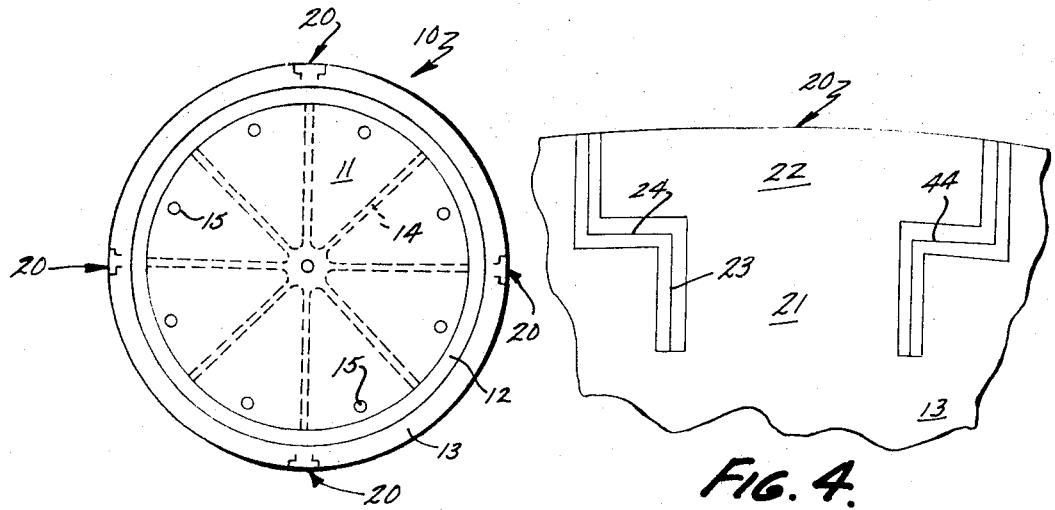

ABSTRACT OF THE DISCLOSURE

A food container particularly adapted for carry-out pizza restaurants and the like formed from two identical members each of which is shaped in the form of a flanged pie pan. The members are formed from an insulating material, preferably closed-cell polystyrene. Each of the members has a plurality of generally T-shaped latches cut into the flange thereof. The wider portion of the T-shaped latches borders the periphery of the flange and the legs extend generally inwardly therefrom to form a hinge. The flanges of the two identical members are abutted against one another in reverse fashion with the T-shaped latches on the upper and lower member circumferentially aligned and the upper latches pushed downwardly. The flexible characteristics of polystyrene permit the wide or latching portion to flex slightly and pass beneath the flange on the lower member.

BACKGROUND

This invention relates to food containers and, more particularly, to insulating food containers particularly adapted for utilization by carry-out restaurants or the like to package relatively flat edible articles such as pizza pie.

One of the problems which has plaqued the carry-out food industry from its inception has been the provision of a suitable container into which the food is placed during the interval between preparation thereof and its arrival at the particular location at which it is to be eaten. The problem has been particularly acute where the food must be kept hot during this interval in order to retain the taste-appealing qualities so necessary to success in businesses of this type. Thus, for example, the typical carry-out pizza restaurant is forced to provide heated ovens in their delivery trucks, if the pizzas are to be hot when they arrive at the location where they are to be eaten. If, on the other hand, the customer picks the pizza up himself, there is little hope of his being able to keep it warm and, thus, the meal when eaten is of questionable quality at best.

In recent years, a number of foamed, closed-cell synthetic materials have become available such as polystyrene which are extremely effective as heat insulators. A number of attempts have been made to adapt materials of this type for utilization in carry-out food containers and some success has been had, particularly in the cup and glass fields. Little success has been achieved, however, where more complex structures were required in order to securely seal the container and, yet, be able to provide the container to carry-out restaurants at a price which would allow them to remain competitive.

OBJECTS AND SPECIFICATION

It is an object of this invention, therefore, to provide an insulated food container fabricated from a foamed closed-cell synthetic material.

More particularly, it is an object of this invention to provide a novel container structure particularly adapted for utilization by carry-out pizza pie establishments which may be fabricated from highly insulative materials of the type described at a price which does not competitively preclude its utilization.

Thus, it is an object of this invention to provide a container of the type described having two identical components either of which may be utilized as the top or bottom and, thus, which may be fabricated utilizing only one die, mold or the like.

It is yet another object of this invention to provide a container of the type described embodying novel reversible means for affixing the top and bottom together in heat-sealed fashion which, while being extremely inexpensive to fabricate, permits a good seal to be obtained between the two component parts with little special attention required on the part of the restauranteer.

These as well as other objects of this invention will be readily understood with reference to the following specification and accompanying figures in which:

FIG. 1 is a plan view of the novel container member;

FIG. 2 is a side-elevational view, partially in cross section of the container member;

FIG. 3 is a fragmentary side-elevational view, partially in cross section, illustrating upper and lower members in sealed relationship; and FIG. 4 is a fragmentary plan view illustrating the manner in which the locking tab may be integrally fabricated with the container member.

Briefly, this invention comprises a first seamless integral one-piece member formed from a closed-cell, foamed synthetic material having an enlarged generally planar section from which extends a peripheral wall. The wall terminates in a peripheral flange having a surface generally parallel to the surface of the planar section. A second seamless integral one-piece member formed from similar material, also having planar, wall and flange sections, is adapted to be fitted together with the first member such that the peripheral flanges abut one another to define a food containing cavity between the planar sections bounded on the edges by the walls. Means are provided for retaining the flanges in abutment with one another.

Referring now to the figures, a preferred embodiment of this invention will be illustrated in detail. Referring initially to FIGS. 1 and 2, the novel container member, indicated generally by the reference numeral 10, comprises a planar base or top section 11 (depending upon whether it is used as the base or top), having a peripheral wall 12 extending outwardly and upwardly therefrom. The wall 12 terminates in a peripheral flange 13 which, in the preferred embodiment of the invention lies in a plane parallel to the general plane of the expanded planar surface 11. The overall configuration, as shown best in FIG. 2, resembles that of a flanged pie plate.

The enlarged planar surface or body section 11 preferably has incorporaten integrally therein suring fabrication a plurality of radial reinforcing ribs 14 which, depending upon the characteristics of the particular synthetic foam utilized, may be necessary to give the container sufficient structural rigidity. Positioned at suitable locations on the surface 11 are a plurality of breather apertures 15 which communicate completely through the surface 11 to permit the evaporation of moisture from the container after it has been sealed.

Referring additionally to FIG. 4, the flange 13 is provided with a plurality of tab assemblies indicated generally by the reference numeral 20 which, as shown specifically in FIG. 4, may be formed by merely die cutting the edge of flange 20 at appropriate spaced locations during fabrication of the container member 10. Each of the tab assemblies 20 comprises a leg 21 having an enlarged latch section 22. The leg section 21, while bendable with respect to the flange 13, is left integrally connected therewith and preferably extends inwardly in generally radial fashion with respect to the container member. Described in an alternate fashion, the tab assembly 20 comprises a T-shaped cut, the cross bar of which borders and forms a part of the peripheral edge of flange 13 and the leg of which extends in generally radial fashion with respect to the container and remains integrally attached thereto.

As illustrated in FIG. 3, when it is desired to package a pizza or the like, a first container member 10b is selected and placed on the counter or the like with its body section 11b and reinforcing ribs 14b in abutting relationship thereto. The pizza or the like is then placed into the member concavity and a second, identical member 10a positioned over the first member in inverted fashion such that the peripheral flanges 13 abut one another and the tab assemblies 20 on the two members are circumferentially aligned.

The waiter, cook or the like then pushes downwardly on each of the tab assemblies 20 on the upper member (20a on 10a) causing the edges of both the upper and lower tab members to separate from their adjacent flanges. As the depression continues, the enlarged latch section 22a on tab 20 flexes slightly to permit it to pass partially through and partially around the ends of the space vacated immediately prior by the flexing downwardly of leg section 21b in flange 13b. As the rear face 24a of tab 22a clears the slot defined by the walls 23b in flange 13b, it reflexes to its initial width and the rear faces 24a bind at the lower edges of the slot 23b. If, as shown in the preferred embodiment of the invention, the flanges contain four tab assemblies 20 at 90° angles, the packer may push two of the oppositely disposed tabs 20a downwardly, rotate the package slightly and then push the remaining tab assemblies down simultaneously.

The inherent flexibility and resilience of the material from which the container is fabricated causes the flanges 13a and 13b to be locked together in generally airtight relationship by tab assemblies 20. This provides an extremely effective heat seal and the edible product contained within the enclosure will stay warm for a substantial period of time.

When the two component members 10a and 10b are assembled in a manner shown in FIG. 3, the tab assemblies 20b are basically non-functional although, to some extent, their inherent resilience aids in biasing the tabs 20a into abutment with flange 13b to retain it in sealed relation with respect to flange 13a. If, on the other hand, container 10a had been chosen first by the packer and placed on the counter in inverted fashion with respect to that illustrated in FIG. 3, or if the tab assemblies had been pushed upwardly instead of downwardly, the tab assemblies 20b would perform the primary retaining function while the tab assemblies 20a would have been basically non-functional. The provision of the identical tab assemblies 20a and 20b on the identical component members 10a and 10b, thus, permits the utilization of identical components to form both the base and cover of the closed assembly and, therefore, obviates any necessity of providing structurally differing covers and bases for the container. This factor, in turn, substantially reduces the expense with which the container may be fabricated since a single die, mold or the like may be utilized to form the complete assembly. It results, additionally, in a decrease in distribution expenses since no care need be taken to insure that a proper number of lids are packaged with a given quantity of bases, it simply being necessary to double the number of containers desired in order to ascertain the particular quantity of identical component members 10 to be shipped.

The individual container members 10 may be fabricated by any of a number of well-known molding techniques such as vacuum forming or blow molding and the serrations for the tabs 20 may be made either during the molding process or subsequent thereto. As noted, any foamed, closed-cell synthetic material, preferably a thermoplastic, having the proper conductivity and structural characteristics may be utilized as the basic fabrication material. Merely by way of example, Pelaspan Expandable Polystyrene 222 (Dow) having a density of 2.0 pounds per cubic foot, a compressive strength in the range of 25–30 pounds per square inch, a thermal conductivity of 0.230, a heat distortion of 185° F., a water vapor transmission of 1.2 and a water absorption rate of 1.0 has been found acceptable. The actual dimensions of the container will depend, of course, upon the particular article to be packaged therein.

While a preferred embodiment of this invention has been described in detail, it will be readily apparent to those skilled in the art that many other embodiments may be conceived and fabricated without departing from the spirit and scope of this specification and the accompanying drawings.

We claim:

1. A food container comprising a first seamless, integral, one-piece member formed from foamed, closed-cell synthetic material, said first member having an enlarged body section from which extends transversely a peripheral wall, said wall terminating in a peripheral flange having a surface generally parallel to the surface of said body section, said peripheral flange having at least two retaining members formed therein, each of said retaining members having a bendable leg portion and a latch portion enlarged with respect to said leg portion, said latch portion bordering the periphery of said flange and said leg portion extending generally inwardly therefrom, said leg and latch portions being cut from the material forming said flanges but left connected thereto via said leg section, a second one-piece member identical to said first member, said one-piece members being affixable together with the open faces of their peripheral flanges abutting one another to define a food containing cavity between said body sections bounded on the edges by said walls, the latching members on either of said peripheral flanges being forceable to a position on the side of the other of said peripheral flanges opposite from said abutting faces and into engagement therewith, thereby forcing the latch portions of said retaining members on the other of said flanges away from the plane of said other flange to secure said one-piece members together.

2. The container as set forth in claim 1 wherein each of said members have the shape of flanged pie plates.

3. The container as set forth in claim 2 wherein each of said members has a plurality of apertures therein to permit moisture escape from the interior of said container.

4. The container as set forth in claim 2 wherein each of said members has a plurality of reinforcing ribs in the planar section thereof.

5. The container as set forth in claim 4 wherein said ribs extend radially from the center of said planar sections.

References Cited

UNITED STATES PATENTS

| | | | |
|---|---|---|---|
| 2,080,125 | 5/1937 | Frost | 99—172 X |
| 3,084,842 | 4/1963 | Beech | 229—2.5 |
| 3,184,047 | 5/1965 | Gilman et al. | 229—2.5 X |
| 3,346,400 | 10/1967 | Roesner | 229—2.5 X |

OTHER REFERENCES

Baking Industry, Dec. 3, 1955, Ekco-Alcoa advertisement on p. 35.

DAVIS L. MOORHEAD, *Primary Examiner.*

U.S. Cl. X.R.

99—172; 229—43